Jan. 12, 1932. K. NOLTE 1,841,199
SHEET PILING
Filed Jan. 30, 1931
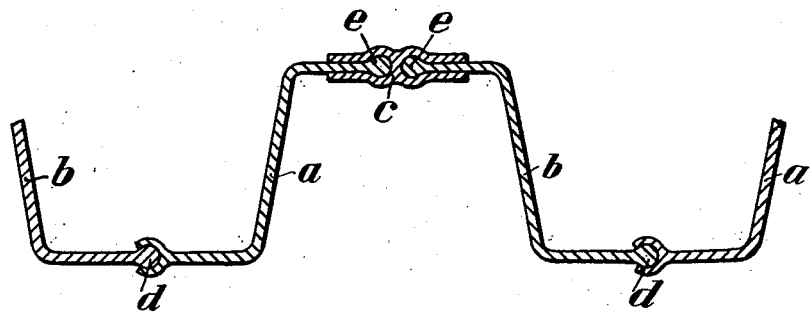
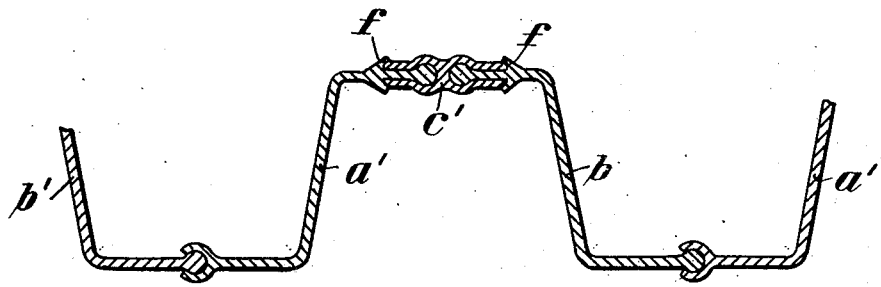

Patented Jan. 12, 1932

1,841,199

UNITED STATES PATENT OFFICE

KARL NOLTE, OF DORTMUND, GERMANY

SHEET PILING

Application filed January 30, 1931, Serial No. 512,450, and in Germany January 30, 1930.

This invention is intended to provide an improved piling or coffer-dam wall construction, with reference more especially to the rigidity and strength.

As well known, S or Z shaped sheet piling members forming a wall with connecting joints situated outside the neutral axis thereof are subjected to springing apart very easily while ramming into place, which gives rise to much difficulty and delay in assembling them properly in a wall construction. Even a rigid connection together by interlocking union or joint locking bars to form a channel design does not always prevent the springing open of the joints and it is almost impossible to attain a really rigid jointure of adjacent members in place, due to the strain from necessary ramming, even if they are put together in united pairs.

The present invention affords a remedy in that those jointing members which, on account of the ramming cannot be rigidly connected together but may only be slipped one into the other, are so connected by means of an intermediate member that springing open is precluded even under the maximum strains imposed.

Two practicable embodiments of the invention are illustrated in cross section by the attached drawings, in which Fig. 1 represents one form and Fig. 2 another.

Fig. 1 shows two Z-shaped sheet-piling members $a$ and $b$ connected together by a locking member $c$ and also rigidly connected at the joints $d$ by pressing, welding or the like. The members $a$ and $b$ are each formed with bulbous edges $e$ along the sides which are connected together by said member $c$, but they differ from each other in that whereas one ($b$) has a similar edge $d$ at its opposite side, the other ($a$) has a claw or socket-edge at the opposite side, providing for uniting to a duplicate of said one on the opposite side of the middle plane of the two.

The aforesaid member $c$ is slipped over the bulbous edges of these piling members ($a$ and $b$) and is formed with two integrally connected claws which oppositely extend substantially and closely over the flange portions thereof so as entirely to prevent the joint from springing open, even under the application of the greatest forces.

A further security against opening can be provided, according to Fig. 2, wherein the ends of the flange portions of the piling members $a$ and $b$ connected by a corresponding intermediate member $c'$ are shown formed with abutment ribs or tongues $f$ along their edges, which engage the outer edges of the claw parts of said connecting member.

Obviously the joints could be designed to enable the outer surfaces of the Z-sections to lie flush with one another, so as to present a level surface for the attachment of structural members, such as channel-iron anchors. The joints could also be locked together without any intermediate members if made of sufficient thickness. This affords the advantage that those edges of the Z-sections which are to be united by pressing, welding or the like may be of slender construction, only those edges of the channels formed which connect with adjacent members being made stouter.

Having now particularly described and ascertained the nature of my said invention and in what manner the same is to be performed, I declare that what I claim is:—

1. A sheet-piling wall of Z-shaped section members assembled in channel forming relation with rigid jointure in pairs at one side and interlocking connections at the other; said connections comprising double-end deep-socketed plate members into which bulbous edges of the same slidably fit with the bifurcated portions of said members extending substantially and closely over the flange portions or margins thereof in a virtually rigid joint.

2. A sheet-piling wall according to claim 1, wherein the flange portions of the section members are formed with ribs on opposite surfaces engaging over the outer ends of the plate members connecting the same together.

3. A sheet-piling wall comprising Z-shaped section members having bulbous side edges and double-end socketed plate members interconnecting the same in channel-forming relation; said plate members being slidably engaged over the marginal portions of said section members with the bulbous edges of the same deep seated therein and with the ends thereof substantially and closely embracing their said portions.

4. A sheet-piling wall comprising Z or S-shaped section members having bulbous side edges rigidly united at one side of the wall in a channel-form assembly, and double-end socketed plate members interconnecting the same at the other side of the wall; said plate members being slidably engaged over the opposing marginal portions of adjacent section members with the bulbous edges of the same deep seated therein and with their ends substantially and closely embracing said marginal portions of the section members so as to provide a substantially rigid connection therebetween.

5. A sheet-piling wall according to claim 4, wherein the marginal portions of the section members are formed with longitudinal ribs on opposite sides which engage against the ends of the plate members in a vice-like relation.

In testimony whereof I affix my signature.

KARL NOLTE.